United States Patent [19]
Griffin et al.

[11] Patent Number: 6,069,840
[45] Date of Patent: May 30, 2000

[54] MECHANICALLY COUPLED HELMHOLTZ RESONATORS FOR BROADBAND ACOUSTIC ATTENUATION

[75] Inventors: Steven Griffin, Albuquerque; Steven Huybrechts, Sandia Park, both of N.Mex.

[73] Assignee: The United States of America as represented by the Secretary of the Air Force, Washington, D.C.

[21] Appl. No.: 09/252,379

[22] Filed: Feb. 18, 1999

[51] Int. Cl.$^7$ .............................. G10K 11/00; F16F 15/00
[52] U.S. Cl. .................................. 367/1; 181/207
[58] Field of Search .................. 367/1; 181/271, 181/207, 208

[56] References Cited

U.S. PATENT DOCUMENTS

| | | | |
|---|---|---|---|
| 3,850,261 | 11/1974 | Hehmann et al. | 181/286 |
| 4,298,090 | 11/1981 | Chapman | 181/286 |
| 5,103,931 | 4/1992 | Okazaki et al. | 181/271 |

Primary Examiner—Ian J. Lobo
Attorney, Agent, or Firm—Kenneth E. Callahan

[57] ABSTRACT

A plurality of Helmholtz resonators with varying physical characteristics are mechanically coupled within a structure to drastically reduced acoustic transmission through the structure or along a pipe. These mechanically coupled resonator structures produce much flatter broadband acoustic attenuation than uncoupled resonators.

2 Claims, 4 Drawing Sheets

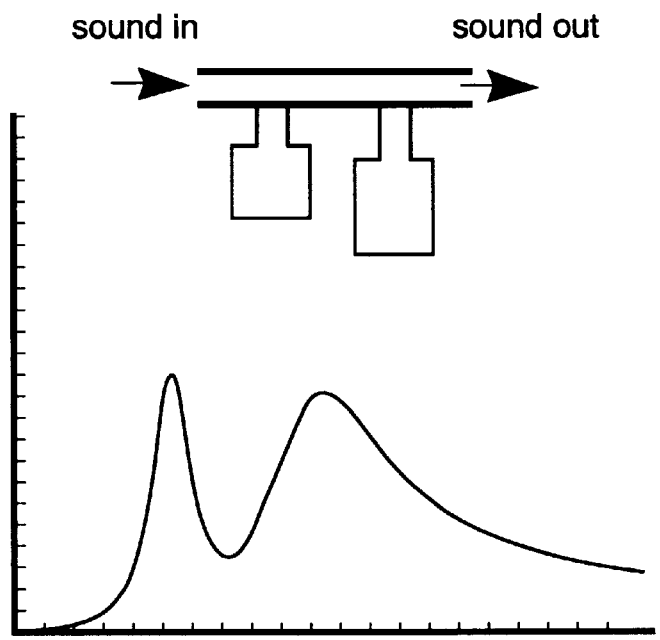
Fig. 1  Frequency
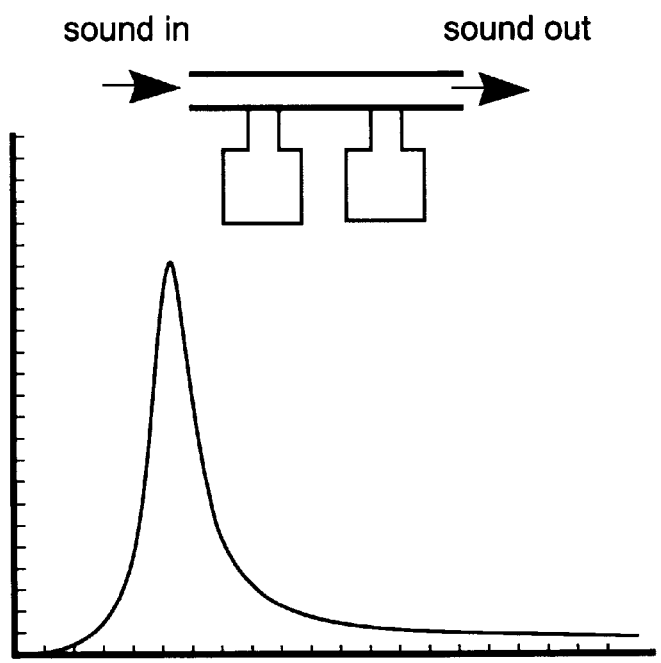
Fig. 2  Frequency

| Property | Symbol | 1st case value | 2nd case value | 3rd case value |
|---|---|---|---|---|
| speed of sound | ao | 340 m/s | 340 m/s | 340 m/s |
| air density | ro | 1.23 kg/m³ | 1.23 kg/m³ | 1.23 kg/m³ |
| flow resisitivity | rf | 10 MKS rayls | 10 MKS rayls | 10 MKS rayls |
| resonator vent area 1 | a1 | .00031 m² | .00031 m² | .00031 m² |
| resonator volume 1 | v1 | .0002 m³ | .0002 m³ | .0002 m³ |
| resonator natural frequency 1 | fo1 | 504Hz | 504Hz | 504Hz |
| resonator vent area 2 | a2 | .00031 m² | .005 m² | .005 m² |
| resonator volume 2 | v2 | .0002 m³ | .0002 m³ | .0002 m³ |
| resonator natural frequency 2 | fo2 | 504 Hz | 1031 Hz | 1031 Hz |
| resonator vent length | t | .001 m | .001 m | .001 m |
| distance between resonators | l | .04 m | .04 m | .04 m |
| linkage vent area | a3 | .005 m² | .005 m² | .005 m² |
| plug mass | m3 | n/a | n/a | n/a |
| glue stiffness | kk | infinite | infinite | 10000 N/m |
| glue damping | cc | n/a | n/a | 5 Ns/m |

*Fig. 5*

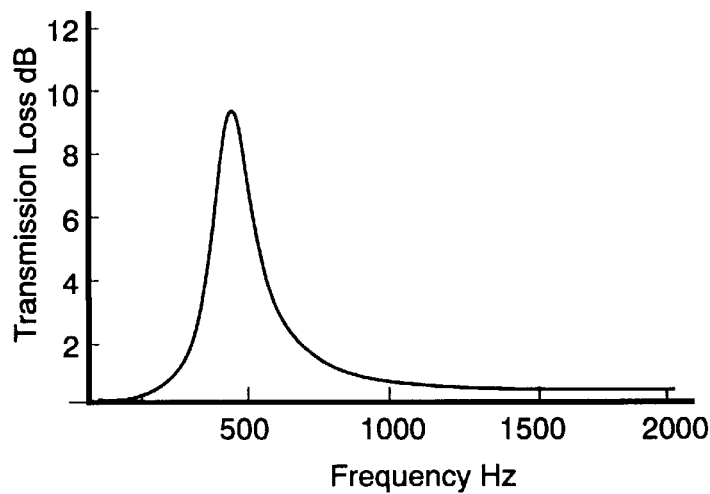

*Fig. 6*

MECHANICALLY COUPLED HELMHOLTZ RESONATORS FOR BROADBAND ACOUSTIC ATTENUATION

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

This invention is in the field of acoustic attenuation structures, and in particular applies to broadband noise suppression using mechanically coupled Helmholtz resonators.

2. Description of the Prior Art

Broadband noise suppression is of interest in many areas including but not limited to launch vehicles, aircraft, automotive mufflers, and many common engines and commercial HVAC systems. One traditional approach to noise suppression is the use of Helmholtz resonators. These are carefully sized cavities that can provide excellent noise suppression at a specific frequency. Unfortunately, all of the noise sources described above are broadband and, therefore, must be targeted by noise suppression approaches that suppress acoustics over a wide spectrum of frequencies. Multiple Helmholtz resonators can be used to target such broadband spectrums by tuning each resonator to a different frequency. The acoustic attenuation, however, will still have peaks corresponding to each targeted frequency with valleys in between.

The present invention provides a method to substantially "smooth" out these peaks and valleys. By mechanically coupling multiple Helmholtz resonators, many new degrees of freedom can be added to the system. These degrees of freedom can be used to target additional frequencies between the peaks causing the acoustic attenuation to be significantly more flat, and thereby better targeting broadband acoustic noise.

SUMMARY OF THE INVENTION

A plurality of Helmholtz resonators, each tuned to a different frequency, are mechanically coupled to significantly improve the broadband acoustic attenuation achievable by a plurality of uncoupled resonators. The mechanical coupling can be achieved by using non-rigid resonator walls, by using rigid walls with tuned spring-damper systems, or by making the walls between resonators flexible with tuned mass and stiffness properties. The resulting noise suppressing structures can be tailored to the specific acoustic environment.

BRIEF DESCRIPTION OF THE DRAWINGS

FIG. 1 is a plot of the attenuation vs. frequency for a structure with two different Helmholtz resonators.

FIG. 2 is a plot of the attenuation vs. frequency for a structure with two identical Helmholtz resonators.

FIG. 5 is a table of the geometric parameters for three different cases.

FIG. 6 is a plot for the transmission loss in the case of no mechanical coupling and identical resonators—case 1.

DESCRIPTION OF THE PREFERRED EMBODIMENT

Helmholtz resonators can be "tuned" to the frequencies of greatest difficulty in a particular application. Since the resonant frequency of each resonator is determined by its geometry, the selection of resonant frequencies will, to some extent, be constrained by the geometry of the particular application. Also, since most applications have ambient noise that is broadband in nature, the frequencies selected for each resonator would be such that they are closely spaced and overlapping in the frequency region where attenuation is desired. FIG. 1 and FIG. 2 illustrates how the selection of geometrical parameters in two resonators can achieve transmission loss over a broader bandwidth than that achieved with two identical resonators at the expense of the absolute amplitude of the achievable transmission loss.

Traditionally, the analysis of Helmholtz resonators is done assuming that the cavity walls are rigid. The present invention recognizes that these walls can be made "soft" so as to create a system of coupled Helmholtz resonators. A system of coupled Helmholtz resonators could be achieved by tailoring the compliance and the mass of the plugs between contiguous resonators in a tube. These parameters can be controlled in practice by selecting the mass properties of the plugs and the glue that bonds them in place. Alternatively, individual Helmholtz resonators could be coupled through the use of rigid walls and spring-damper systems. In both cases these multiple coupled resonators contain additional peaks in transmission loss when compared to uncoupled resonators. These peaks allow for further tailoring of the transmission loss to get an even broader band effect.

Figure 3:
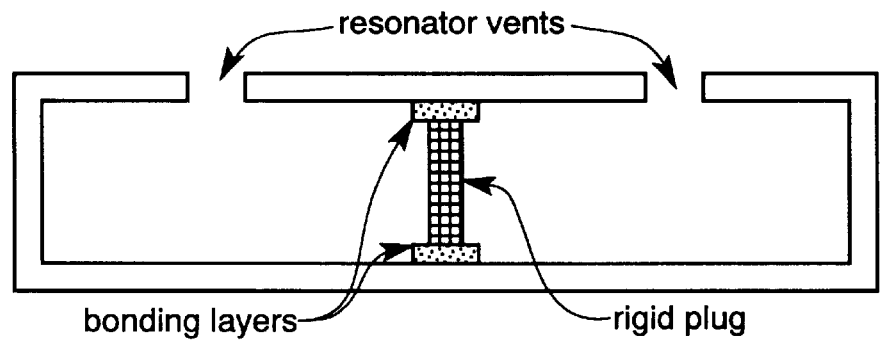
FIG. 3 is a diagram of two contiguous resonators coupled by a rigid plug secured with adjustable bonding layers.

The simplest example that has all the acoustic elements of this new design is two contiguous resonators that are coupled by a rigid plug as shown in FIG. 3. The bonding layers' shear modulus and damping can be adjusted as well as the mass of the plug.

Figure 4:
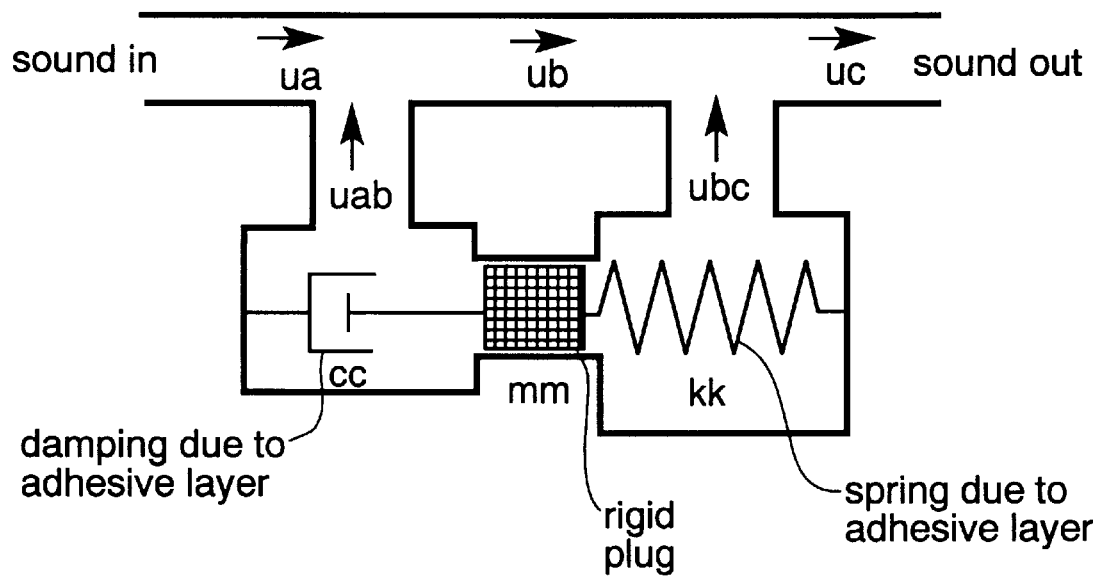
FIG. 4 is a schematic of two mechanically coupled resonators with the resonator vents connected with a pipe or air gap.

To illustrate the placement of the additional peak in the transmission loss, the example of two Helmholtz resonators to reduce noise in a pipe is examined in detail. A schematic of this setup is shown in FIG. 4. This arrangement is convenient since there is a closed-form solution to the problem that illustrates the potential advantages as long as the wavelength of the sound is large compared to both the dimensions of the pipe and the resonators. When the additional peak is judiciously placed, by careful selection of both the plug mass and glue compliance values, it combines with the other two peaks associated with each resonator to form a relatively broadband region of transmission loss. With many resonators and many plugs, the high transmission loss region could be made arbitrarily broad within the physical constraints of the resonators.

When the equations that relate the parameters in FIG. 4 are combined with the input impedance equations for the resonators, the resulting coupled equations can be solved simultaneously to give a frequency dependent solution for $t_c$ which represents the transmitted pressure from point a to point c in FIG. 4. The quantity $t_c$ is related to the transmission loss from point a to point c by $$TL = -10 Log_{10}(|t_c|^2)$$

If the compliance of the glue were zero and the geometrical parameters of each resonator were set to the same values, we would have the limiting case of no mechanical coupling between two identical resonators. The transmission loss for this case, with representative geometry values given in the FIG. 5 table as case 1, is shown in FIG. 6.

Figure 7:
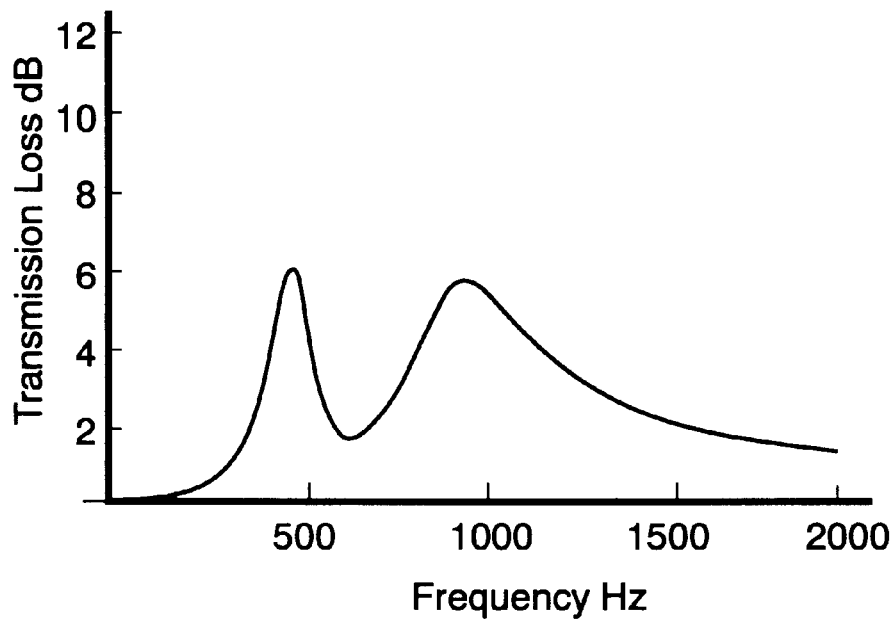
FIG. 7 shows the transmission loss for two different resonators and no mechanical coupling—case 2.
Figure 8:
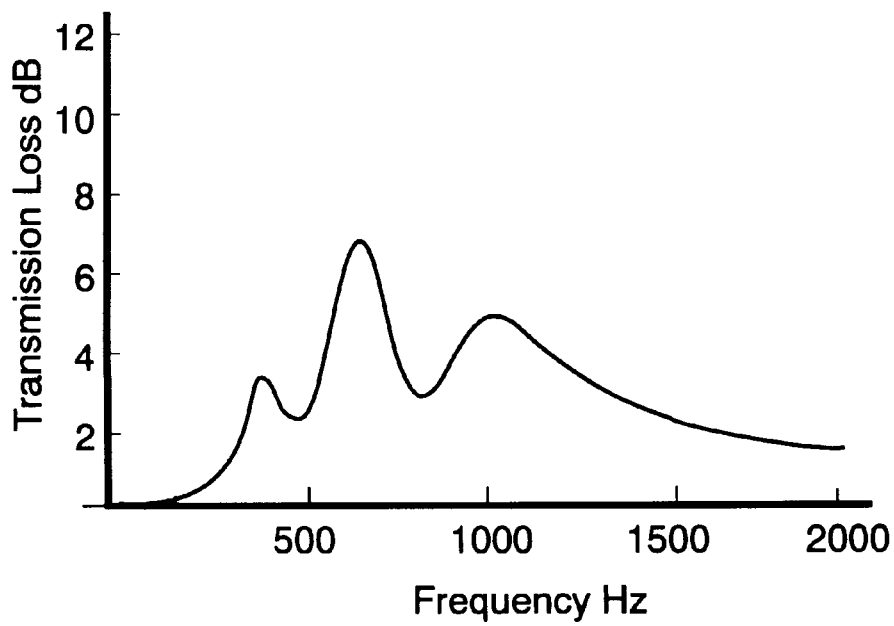
FIG. 8 shows the transmission loss for two different mechanically coupled resonators—case 3.

If the geometrical parameters were slightly different for each resonator, but the glue bond was still rigid, we would get the transmission loss shown in FIG. 7 with two peaks at lower amplitudes than the single peak shown in FIG. 6. Finally, if the glue compliance is adjusted to a nonzero value, we get three peaks in the transmission loss as shown in FIG. 8. The geometrical and other adjusted parameters are also given in FIG. 5 as cases 2 and 3, respectively. If an optimization were applied to this problem, the values and the amplitudes of these three peaks could be adjusted to give the maximum attenuation for the broadband sound of interest.

Although the simplifying constraints on the pipe example are not in general satisfied in the various real world applications, similar behavior can be expected in the transmission loss. The vehicle problem with Helmholtz resonators does not have a closed-form solution and will require finite element and/or boundary element analysis to fully understand.

The technique of the present invention is applicable to various structures employing sandwich core-type construction, such as honeycomb core cells sandwiched between facesheets with perforations in one of the facesheets. The individual cells of the sandwich core material could be made non-rigid to varying degrees, thereby coupling the resonant cavity of each cell with adjacent cells. Each cell would have a hole forming the Helmholtz resonator. The hole size, the cell volume, along with the cell wall mass and stiffness properties could be varied to achieve the desired noise suppression spectrum.

Another application particularly suitable for this noise suppression technique involves a new structure called ChamberCore, the subject of a copending application. ChamberCore is composed of previously cured tubes that are sectioned to form chambers and co-cured with facesheets to form a sandwich-type structure. The tubes are longitudinally secured to the facesheets. Each chamber has a hole to it through the inner facesheet effectively converting it into a Helmholtz resonator. The mass and stiffness properties of the plugs dividing the tubes into chambers would be varied to mechanically couple the adjacent resonators.

We claim:

1. A method of producing broadband acoustic attenuation properties in material structures, the method comprising;

mechanically coupling a plurality of contiguous Helmholtz resonator chambers in a structure, each of said Helmholtz resonator chambers having a variable volume and vent area, and said mechanical coupling between said resonator chambers comprised of non-rigid walls separating said contiguous resonator chambers, said non-rigid walls having variable mass, stiffness, and damping characteristics; and varying the mechanical coupling characteristics of said non-rigid walls and said volume and vent area of said contiguous Helmholtz resonator chambers to thereby achieve the desired noise suppression spectrum by creating 2n−1 transmission loss peaks for a system of n contiguous traditional Helmholtz resonators.

2. A material structure to effect broadband acoustic attenuation, the structure comprised of:

a plurality of contiguous Helmholtz resonator chambers, each chamber have variable volume and variable vent areas; and non-rigid wall separators between said contiguous Helmholtz resonator chambers, each separating wall having variable characteristics of mass, stiffness, and damping, whereby the desired noise suppression spectrum is achieved by varying the volumes and/or vent areas of the resonator chambers and by varying the non-rigid separating walls' mass, stiffness, and/or damping characteristics as appropriate to achieve the desired broadband acoustic attenuation spectrum.

* * * * *